United States Patent
Slane et al.

(10) Patent No.: US 10,785,831 B2
(45) Date of Patent: Sep. 22, 2020

(54) MICRO-PERFORATIONS FOR CNT HEATERS

(71) Applicant: Goodrich Corporation, Charlotte, NC (US)

(72) Inventors: Casey Slane, Richwood, OH (US); Jin Hu, Hudson, OH (US); Galdemir Cezar Botura, Akron, OH (US); Nathaniel Ching, Hartville, OH (US)

(73) Assignee: Goodrich Corporation, Charlotte, NC (US)

( * ) Notice: Subject to any disclaimer, the term of this patent is extended or adjusted under 35 U.S.C. 154(b) by 344 days.

(21) Appl. No.: 15/789,632

(22) Filed: Oct. 20, 2017

(65) Prior Publication Data
US 2019/0124724 A1  Apr. 25, 2019

(51) Int. Cl.
| | |
|---|---|
| *H05B 3/14* | (2006.01) |
| *C01B 32/158* | (2017.01) |
| *C01B 32/168* | (2017.01) |
| *B64D 15/12* | (2006.01) |
| *C01B 32/194* | (2017.01) |

(52) U.S. Cl.
CPC .............. *H05B 3/145* (2013.01); *B64D 15/12* (2013.01); *C01B 32/158* (2017.08); *C01B 32/168* (2017.08); *C01B 32/194* (2017.08); *H05B 2203/007* (2013.01); *H05B 2203/017* (2013.01); *H05B 2214/04* (2013.01)

(58) Field of Classification Search
CPC . H05B 3/145; H05B 3/34; H05B 3/18; H05B 3/28; H05B 3/26; H05B 2203/017; H05B 2203/007; H05B 2203/04; H05B 2214/04; H05B 2214/02; C01B 32/158; C01B 32/168; C01B 32/194; B64D 15/12; B64D 45/02; H02H 1/04; Y10T 29/49083
See application file for complete search history.

(56) References Cited

U.S. PATENT DOCUMENTS

| | | | |
|---|---|---|---|
| 7,938,224 | B2 | 5/2011 | Frustie et al. |
| 8,172,037 | B2 | 5/2012 | Porte et al. |
| 8,991,054 | B2 | 3/2015 | Porte et al. |
| 2007/0210073 | A1* | 9/2007 | Hubert ................... B64D 15/12 219/535 |

FOREIGN PATENT DOCUMENTS

| | | | |
|---|---|---|---|
| EP | 3013119 | * | 4/2016 |
| EP | 3013119 A1 | | 4/2016 |

OTHER PUBLICATIONS

Extended European Search Report for EP Application 18201181.7, dated Feb. 14, 2019, pp. 9.

* cited by examiner

*Primary Examiner* — Shawntina T Fuqua
(74) *Attorney, Agent, or Firm* — Kinney & Lange, P.A.

(57) ABSTRACT

An ice protection heater element includes a carbon allotrope heater with micro-perforations across up to about sixty percent of the carbon allotrope heater's surface. The micro-perforations allow uniform heating across the heating element and tailored electrical resistances for ice protection.

19 Claims, 2 Drawing Sheets

MICRO-PERFORATIONS FOR CNT HEATERS

BACKGROUND

This application relates generally to aircraft ice protection, and specifically to ice protection materials.

Exterior surfaces of aircraft are often subjected to ice formation, and anti-icing or de-icing devices must be used to remove or prevent ice from accumulating. Various types of ice protection systems have been developed to protect aircraft from the hazardous effects of icing, including bleed air, electro-thermal, and pneumatic boot de-icing systems. Electro-thermal de-icing systems typically use metal wires to resistively melt ice by converting electrical energy to thermal energy. The use of metal wires as resistance elements embedded in de-icing systems presents several problems, including element durability, parasitic weight, limited damage tolerance and low power efficiency.

Carbon nanotube (CNT) materials have been proposed as an alternative to metal wire or foil heating elements in ice protection systems. CNTs are carbon allotropes having a generally cylindrical nanostructure. They have unusual properties that make them valuable for many different technologies. For instance, some CNTs can have high thermal and electrical conductivity, making them suitable for replacing metal heating elements. Due to their much lighter mass, substituting CNTs for metal heating components can reduce the overall weight of a heating component significantly. However, CNT heater elements' electrical resistance must be altered to make suitable ice protection heaters.

SUMMARY

A heater element includes a carbon allotrope heater and a plurality of micro-perforations in the carbon allotrope heater, such that up to about sixty percent of the surface of the carbon allotrope heater contains the micro-perforations.

A method of making a heating element includes obtaining a carbon allotrope heater, and micro-perforating up to sixty percent of a surface of the carbon allotrope heater to tailor electrical resistance of the carbon allotrope heater.

DETAILED DESCRIPTION

Ice protection heating elements must be fabricated with a specific electrical resistance. The required resistance depends on where and how the heating element will be applied for ice protection. In order to achieve the correct electrical resistance, vacancies in the heating element can only occupy up to about 50% of the heating area. Typically, vacancies in the heating element are very large to accommodate this requirement. These vacancies create cold spots and prevent uniform heating across a heating element. Using micro-perforations across heating elements (instead of large vacancies) can create a heating element where the heating material occupies between 50% and 100% of the heating area while still allowing uniform heating across the heating element.

Figure 1C:
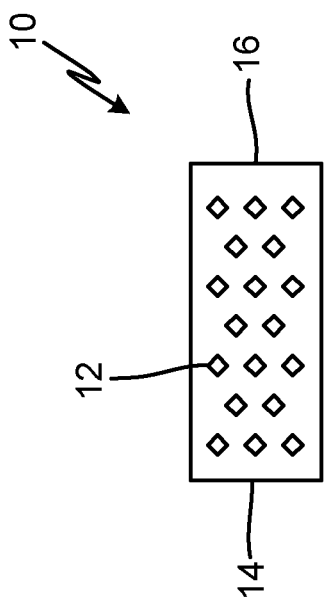
FIGS. 1A-1D are schematic drawings of micro-perforated carbon nanotube heater sheets.
Figure 1D:
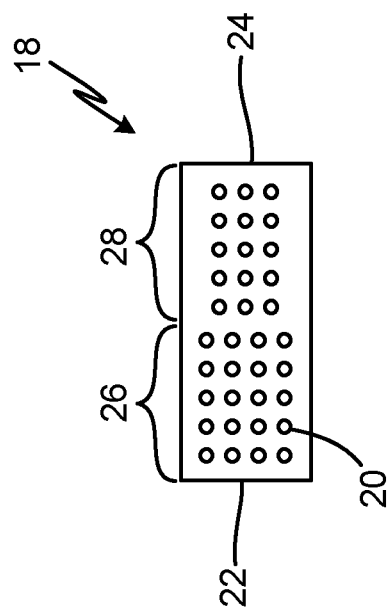
Figure 1A:
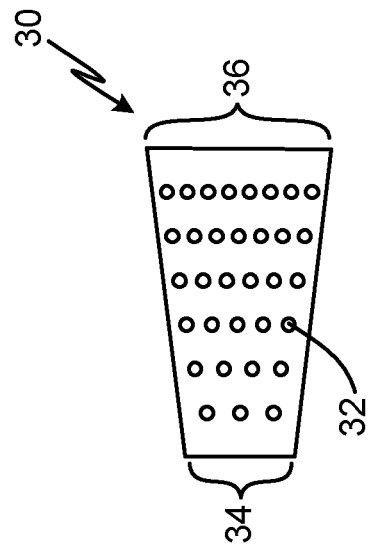

FIGS. 1A-1D are schematic drawings of micro-perforated carbon nanotube heater sheets. In FIG. 1A, carbon nanotube heater sheet 10 is made of carbon nanotubes (CNT), but can be made of other carbon allotropes, such as graphene, graphene nanoribbons (GNRs), graphite or other suitably conductive form of carbon. Heater sheet 10 can be a sheet or film, or other suitable shape for ice protection, such as three dimensional or curved shapes.

Heater sheet 10 has micro-perforations 12, which are very small, microscopic perforations, typically with less than a millimeter diameter. Preferably, the micro-perforations are in the range of less than 1,000 micrometers in diameter. In FIG. 1A, micro-perforations are diamond shaped. Alternatively, micro-perforations can be circles, slits, or other appropriate shapes, depending on requirements for electrical resistance. The amount of micro-perforations can be varied depending on the required electrical resistance range. Micro-perforations can be, for example, up to about sixty percent of heater sheet 10's surface, or up to sixty percent of heater sheet 10's surface at most. Micro-perforations 12 can go through the entire thickness of heater sheet 10, or can protrude partially through the thickness of heater sheet 10, depending on heating needs.

By using micro-perforations, heater sheet 10 can be tuned to the desired electrical resistance while retaining uniform heating characteristics due to the microscopic nature of the perforations. When perforations are created in heater sheet 10, the area of heater 10 used for ice protection in altered. Thus, electrical resistance of the heater is altered. Uniform heating is possible with micro-perforations because there are no large vacant areas in heater 10. Vacancies with micro-perforations can be spread evenly around heater 10 to avoid any high concentration of vacancies.

This allows for both uniform heating and tailored electrical resistance in heater sheets. For instance, a heater sheet being applied to an aircraft wing may requires a different range of electrical resistance than a heater sheet being applied to the leading edge of a horizontal stabilizer. Additionally, electrical resistance along the length of the heater sheet can be tailored. For example, first end 14 of heater 10 can have a higher concentration of micro-perforations 12 compared to second end 16 of heater 10, altering the electrical resistance on either end.

Figure 1B:
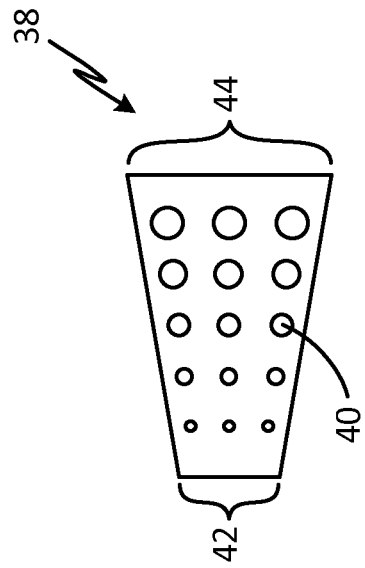

FIG. 1B shows CNT heater sheet 18 with micro-perforations 20, first end 22, and second end 24. CNT heater sheet 18 has first section 26 and second section 28. In CNT heater sheet 18, micro-perforations 20 are circular, and are distributed differently in first section 26 than in second section 28. In heater sheet 18, first section 26 near first end 22 contains a higher density of micro-perforations, whereas second section 28 near second end 24 has a lower density of micro-perforations. This allows for tailoring of CNT heater sheet 18 resistivity across the surface of CNT heater sheet 18. This allows for varying power densities across a heating element. Specifically, this allows for heat fluxes from section to section of a heating element (or multiple heating elements), allowing for tailored heating and efficient design. Thought FIG. 1B shows two sections 26, 28, with different densities of micro-perforations 20, a heater element can contain numerous such sections, or density of micro-perforations can change gradually throughout a heater sheet.

FIG. 1C shows CNT heater sheet 30 with micro-perforations 32, first end 34 and second end 36. Micro-perforations 32 are circular and evenly spaced in heater sheet 30. However, heater sheet 30 consistently increases in width from first side 34 to second side 36. Thus, the absolute number of micro-perforations 32 across CNT heaters sheet 30 from first end 34 to second end 36 increases. CNT heater sheet 30 is appropriate for application to an aircraft part without a rectangular shape. CNT heater sheet 30 is an example of tailoring the overall shape of the CNT heater sheet to meet aircraft part shape or size needs. The configuration of FIG. 1C allows for uniform heating along the length of a heated area that varies in width. This uniformity of heating can alternatively be accomplished through the configuration discussed with reference to FIG. 1B.

FIG. 1D shows CNT heater 38 with micro-perforations 40, first end 42 and second send 44. Micro-perforations 40 increase in diameter from first end 42 to second end 44. Additionally, heater sheet 38 consistently increases in width from first side 42 to second side 44. Thus, micro-perforations 40 with larger diameters fit easily closer to second end 44. CNT heater sheet 38 is an example of tailoring the overall shape of the CNT heater sheet to meet aircraft part shape or size needs.

Figure 2:
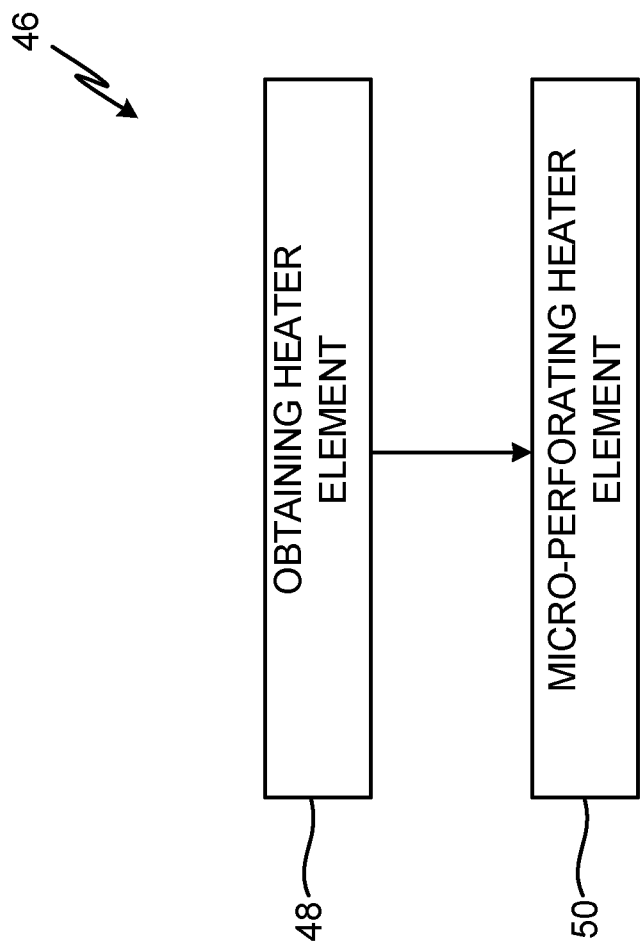
FIG. 2 is a flow diagram showing a method of making a micro-perforated carbon nanotube heater.

FIG. 2 is a flow diagram showing method 20 of making a micro-perforated carbon nanotube heater. Method 20 includes forming a from a carbon allotrope heater (steps 22) and creating micro-perforations in the carbon allotrope heater (step 24).

First, the carbon allotrope heater is created in step 22. The carbon allotrope heater, as described in reference to FIG. 1, can be made of carbon nanotubes, or other suitable materials, such as graphene, graphene nanoribbons, graphite, or other conductive forms of carbon. The carbon allotrope heater can be a film or sheet, woven or non-woven, created from a carbon allotrope slurry, or bought from a commercial supplier. Alternatively, the carbon allotrope heater can be a curved or three dimensional shape made to fit an aircraft part which it will de-ice. The heater is dried or cured as needed prior to step 24.

Next, in step 24, micro perforations are formed in the carbon allotrope heater. The micro perforations can be made by techniques such as laser cutting, cold ablation, sand blasting, water jets, physical pounding, or other appropriate means to create micro-perforations that run through the carbon allotrope heater (or, if desired, run partially through the carbon allotrope heater). For example, if cold ablation is used, a laser is used to remove material with minimal heat production due to short pulse lengths. In this case, a pico- or femtosecond laser is used. In this technique, the lesser amount of heat build-up prevents damage in other layers of a heater assembly during creation of micro perforations and prevents premature failures. The micro perforations should have diameters of less than 1 millimeter, or preferably less than 1,000 nanometers, and can be in a variety of shapes, includes circles, slots, diamonds, and other shapes. The micro-perforations should be distributed across the heater as needed to tailor the electrical resistance of the carbon allotrope heater without leaving vacancies in the carbon allotrope heater.

Alternatively, multiple layers of carbon allotrope heater sheets can be used, and each sheet can be individually perforated. For instance, a first carbon allotrope heater sheet can be 50% perforated in a specific pattern with particular micro-perforation shapes, and a second carbon allotrope heater sheet can be 40% perforated in a different pattern. In this case, the carbon allotrope heater sheets can be stacked to create a heating assembly, where the micro-perforations line up or are alternated depending on heating needs. Micro-perforations can also be applied to carbon allotrope heaters that are curved or in three dimensional shapes.

Method 20 can be also be used to normalize the resistance of carbon allotrope heater sheet(s) that are not uniform. Sometimes, carbon allotrope heater sheets can be used that have a large tolerance from heater sheet to heater sheet, or within a single carbon allotrope heater sheet. In this case, if the resistance of the carbon allotrope heater sheet can be measured (through traditional contact means, non-contact eddy current measurements, density mappings, or other appropriate means), then micro-perforations can be added to specific portions of the carbon allotrope heater sheet such that the resistance within a carbon allotrope heater sheet (or from heater sheet to heater sheet) is normalized.

The varying micro-perforations allow for varying power densities in the carbon allotrope heater, or from one carbon allotrope heater to another. In this way, the electrical resistance and power density of carbon allotrope heaters can be tailored or altered to each aircraft surface to which the heater(s) will be applied, depending on ice protection needs at each site. Additionally, micro-perforations throughout the carbon allotrope heaters allow for more uniform heating and ice protection.

DISCUSSION OF POSSIBLE EMBODIMENTS

The following are non-exclusive descriptions of possible embodiments of the present invention.

A heater element includes a carbon allotrope heater and a plurality of micro-perforations in the carbon allotrope heater, such that up to about sixty percent of the surface of the carbon allotrope heater contains the micro-perforations.

The heating element of the preceding paragraph can optionally include, additionally and/or alternatively, any one or more of the following features, configurations and/or additional components:

The carbon allotrope heater is made from a material selected from the group consisting of carbon nanotubes, graphene, graphene nanoribbons, and graphite.

Each of the plurality of micro-perforations has a diameter of no more than 10 millimeters.

Each of the plurality of micro-perforations is a shape selected from the group consisting of a circle, a slot, and a diamond.

The plurality of micro-perforations are equally spaced along the surface of the carbon allotrope heater.

The plurality of micro-perforations are concentrated in a first portion of the carbon allotrope heater, and the plurality of micro-perforations are less concentrated in a second portion of the carbon allotrope heater.

The carbon allotrope heater is a flat sheet, a curved sheet, or a three dimensional shape.

The carbon allotrope heater has a continuous change in power density across the plurality of micro-perforations from a first end of the carbon allotrope heater to a second end of the carbon allotrope heater.

The plurality of micro-perforations normalizes heating across the carbon allotrope heater.

The carbon allotrope heater is non-rectangular.

The micro-perforations on the carbon allotrope heater create uniform heating.

The carbon allotrope heater is tapered.

A method of making a heating element includes obtaining a carbon allotrope heater, and micro-perforating up to sixty percent of a surface of the carbon allotrope heater to tailor electrical resistance of the carbon allotrope heater.

The method of the preceding paragraph can optionally include, additionally and/or alternatively, any one or more of the following features, configurations and/or additional components:

Obtaining a carbon allotrope heater comprises supplying a carbon allotrope sheet, shaping a carbon allotrope slurry into a sheet, or shaping a carbon allotrope slurry into a three-dimensional shape.

Micro-perforating is done by laser cutting, sand blasting, water jets, cold ablation, or physical pounding.

Micro-perforating creates circle, diamond, or slit micro-perforations in the carbon allotrope heater.

Micro-perforating creates micro-perforations with diameters of 1,000 micrometers or less.

Micro-perforating is done on a portion of the carbon allotrope heater.

Micro-perforating is done evenly throughout the carbon allotrope heater.

Micro-perforating creates micro-perforations of continuously varying diameters from a first end of the carbon allotrope heater to a second end of the carbon allotrope heater.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heater element comprising:
   a carbon allotrope heater; and
   a plurality of micro-perforations in the carbon allotrope heater, such that up to sixty percent of a surface area of the carbon allotrope heater contains the micro-perforations and wherein the micro-perforations have a diameter of less than one millimeter and protrude at least partially through the carbon allotrope heater.

2. The heater element of claim 1, wherein the carbon allotrope heater material is selected from the group consisting of carbon nanotubes, graphene, graphene nanoribbons, and graphite.

3. The heater element of claim 1, wherein each of the plurality of micro-perforations is a shape selected from the group consisting of a circle, a slot, and a diamond.

4. The heater element of claim 1, wherein the plurality of micro-perforations are equally spaced along the surface of the carbon allotrope heater to create uniform heating characteristics across the surface area of the carbon allotrope heaters.

5. The heater element of claim 1, wherein a first portion of the carbon allotrope heater includes a higher concentration of micro-perforations compared to a second portion of the carbon allotrope heater to alter the electrical resistance of the first portion of the carbon allotrope heater compares to the second portion of the carbon allotrope heater.

6. The heater element of claim 1, wherein the carbon allotrope heater is a flat sheet, a curved sheet, or a three dimensional shape.

7. The heater element of claim 1, wherein the carbon allotrope heater has a continuous change in power density across the plurality of micro-perforations from a first end of the carbon allotrope heater to a second end of the carbon allotrope heater.

8. The heater element of claim 1, wherein a distribution of the plurality of micro-perforations across the surface area of the carbon allotrope heater is selected to create uniform electrical resistance across the surface area of the carbon allotrope heater.

9. The heater element of claim 1, wherein the carbon allotrope heater is non-rectangular.

10. The heater element of claim 9, wherein the micro-perforations on the carbon allotrope heater create uniform heating.

11. The heater element of claim 1, wherein the carbon allotrope heater is tapered.

12. A method of making a heating element comprising:
    obtaining a carbon allotrope heater from at least one carbon allotrope; and
    micro-perforating up to sixty percent of a surface area of the carbon allotrope heater to tailor electrical resistance of the carbon allotrope heater, such that the micro-perforations have a diameter of less than one millimeter and protrude at least partially through the carbon allotrope heater.

13. The method of claim 12, wherein obtaining a carbon allotrope heater comprises supplying a carbon allotrope sheet, shaping a carbon allotrope slurry into a sheet, or shaping a carbon allotrope slurry into a three-dimensional shape.

14. The method of claim 12, wherein micro-perforating is done by laser cutting, sand blasting, water jets, cold ablation, or physical pounding.

15. The method of claim 12, wherein micro-perforating creates circle, diamond, or slit micro-perforations in the carbon allotrope heater.

16. The method of claim 12, wherein micro-perforating creates micro-perforations with diameters of 1,000 micrometers or less.

17. The method of claim 12, wherein micro-perforating is done on a portion of the carbon allotrope heater.

18. The method of claim 12, wherein micro-perforating is done evenly throughout the carbon allotrope heater.

19. The method of claim 12, wherein micro-perforating creates micro-perforations of continuously varying diameters from a first end of the carbon allotrope heater to a second end of the carbon allotrope heater.

* * * * *